(12) United States Patent
Svacek et al.

(10) Patent No.: US 7,349,431 B2
(45) Date of Patent: Mar. 25, 2008

(54) DYNAMIC BANDWIDTH ALLOCATION SYSTEM

(75) Inventors: Joseph R. Svacek, Oceanside, CA (US); Darrel E. Broker, San Diego, CA (US); Terry Kuhonont, Beaverton, OR (US)

(73) Assignee: IPICOM, Inc., Carlsbad, CA (US)

( * ) Notice: Subject to any disclaimer, the term of this patent is extended or adjusted under 35 U.S.C. 154(b) by 936 days.

(21) Appl. No.: 10/080,301

(22) Filed: Feb. 21, 2002

(65) Prior Publication Data

US 2002/0163937 A1   Nov. 7, 2002

Related U.S. Application Data

(60) Provisional application No. 60/275,357, filed on Mar. 13, 2001.

(51) Int. Cl.
   *H04J 3/00*    (2006.01)
(52) U.S. Cl. .................................. 370/468; 710/110
(58) Field of Classification Search ............... None
   See application file for complete search history.

(56) References Cited

U.S. PATENT DOCUMENTS

| | | | |
|---|---|---|---|
| 4,763,321 A * | 8/1988 | Calvignac et al. | 370/236 |
| 4,864,562 A | 9/1989 | Murakami et al. | |
| 4,893,305 A * | 1/1990 | Fernandez et al. | 370/254 |
| 5,241,632 A | 8/1993 | O'Connell et al. | |
| 5,541,919 A | 7/1996 | Yong et al. | |
| 5,594,727 A * | 1/1997 | Kolbenson et al. | 370/442 |
| 5,631,908 A * | 5/1997 | Saxe | 370/235 |
| 5,784,649 A | 7/1998 | Begur et al. | |
| 5,796,729 A * | 8/1998 | Greaney et al. | 370/345 |
| 5,797,043 A | 8/1998 | Lewis et al. | |
| 5,805,589 A * | 9/1998 | Hochschild et al. | 370/389 |
| 5,822,553 A | 10/1998 | Gifford et al. | |
| 5,838,681 A * | 11/1998 | Bonomi et al. | 370/395.41 |
| 5,930,484 A | 7/1999 | Tran et al. | |
| 6,009,108 A | 12/1999 | Takehara et al. | |
| 6,044,225 A | 3/2000 | Spencer et al. | |
| 6,098,124 A | 8/2000 | Odom | |
| 6,185,229 B1 | 2/2001 | Obikane et al. | |
| 6,307,839 B1 * | 10/2001 | Gerszberg et al. | 370/235 |
| 6,389,493 B1 * | 5/2002 | Barkley et al. | 710/110 |
| 6,442,164 B1 * | 8/2002 | Wu | 370/395.21 |
| 6,633,946 B1 * | 10/2003 | Hendel | 710/317 |
| 6,724,772 B1 * | 4/2004 | Borland et al. | 370/442 |
| 6,728,238 B1 * | 4/2004 | Long et al. | 370/352 |
| 6,810,031 B1 * | 10/2004 | Hegde et al. | 370/351 |
| 6,885,639 B2 * | 4/2005 | Kamiya | 370/235 |
| 7,054,310 B1 * | 5/2006 | Shivji et al. | 370/366 |
| 2003/0103450 A1 * | 6/2003 | Chapman et al. | 370/229 |

FOREIGN PATENT DOCUMENTS

WO    WO 99/56423    11/1999

* cited by examiner

*Primary Examiner*—Huy D. Vu
*Assistant Examiner*—Clemence Han
(74) *Attorney, Agent, or Firm*—Gordon & Rees, LLP

(57) ABSTRACT

A digital transmission device for dynamically allocating bandwidth comprises a plurality of peripheral cards, that require different amounts of system bandwidth, and an allocation module. The allocation module is connected to the plurality of peripheral cards by transmission channels and assigns incremental bandwidths to the cards based upon the size of the cards' payload to be transmitted.

14 Claims, 3 Drawing Sheets

DYNAMIC BANDWIDTH ALLOCATION SYSTEM

CROSS-REFERENCE TO RELATED APPLICATION

This application claims the benefit of priority of U.S. provisional application Ser. No. 60/275,357 filed Mar. 13, 2001 which is incorporated herein by reference in its entirety.

FIELD OF THE INVENTION

This invention relates in general to Multiplexing/Demultiplexing systems, and specifically to the use of an allocation module to route/assign a specified amount of bandwidth to any slot in the system at any given time for the purpose of more effective utilization of system bandwidth.

BACKGROUND OF THE INVENTION

In a typical Multiplexing/Demultiplexing system, the system bandwidth (or the number of parallel bits) is usually distributed equally to all peripheral cards in the system. This arrangement works fine as long as all the peripheral cards in the system require the same amount of bandwidth. Thus, the Multiplexing/Demultiplexing system of the prior art is configured for known card-types that must conform to the limitations of the Multiplexing/Demultiplexing system.

FIG. 1 illustrates a prior art system for bandwidth allocation which often leads to wasted bandwidth, especially if the peripheral cards, or personality modules, in the system do not require the same amount of bandwidth. The prior art system of FIG. 1 is comprised of multiple slots 4, 6 and 8, for containing peripheral cards, or personality modules, connected to a multiplexer 2 by transmission channels 10, 12 and 14. The system's bandwidth is divided equally amongst all the personality modules regardless of the bandwidth required, thus wasting bandwidth if all modules are not the same. Although three slots are shown, prior art systems can contain a maximum of N slots where N depends on the system's capability.

In the prior art system, bandwidth is wasted if two different types of personality modules, each of which require different amounts of parallel bits, are used. As an example, the first type of module (PIM-A) requires 5 parallel bits for bandwidth and the second type of module (PIM-B) requires 10 parallel bits for bandwidth. A multiplexer which supports 40 parallel bits is utilized to combine the multiple signals from the personality modules for transmission over a single transmission channel. Using only PIM-A modules or using a combination of the two personality modules (PIM-A and PIM-B) in the slots will result in wasted bandwidth because the system distributes the bandwidth equally to all slots.

The 40 parallel bits that the system can support must be divided up equally among the slots. If only PIM-B personality modules are utilized in the system, a maximum of four modules can be used because each module requires 10 parallel bits of bandwidth, since the four modules each requiring 10 parallel bits reaches the maximum number of bits that the multiplexer can support (4 modules×10 bits each=40 bits). However, if only PIM-A modules are utilized in the system, half of the system bandwidth will be wasted. The system can support up to four personality modules. Each of the four PIM-A modules require 5 parallel bits of bandwidth. (4 modules×5 bits each=20 bits) Since the four PIM-A modules only utilize 20 bits of the 40 bits of bandwidth, the remaining 20 bits will go unused and thus be wasted.

Furthermore, typical digital fiber optic systems use time division multiplexing structures with a fixed rate for each channel. For example, a 2.48 Gb/s transmission system might have a capacity of 16 channels, with each channel having a fixed 155 Mb/s bit rate (155 Mb/s×16=2.48 Gb/s). If a signal interface requiring less than 155 Mb/s is inserted into a channel, the excess capacity cannot be accessed or utilized. As an example, some systems provide a dual DS-3 (45 Mb/s) module. This module requires approximately 90 Mb/s bandwidth, but the entire 155 Mb/s channel bandwidth is used. Similarly, some systems use two 155 Mb/s channels to transport a 270 Mb/s SMPTE (Society of Motion Picture and Television Engineers) 259 signal (a type of digital video format), but 310 Mb/s of bandwidth are used.

Thus, there remains a need for a Multiplexing/Demultiplexing system that supports peripheral cards requiring varying bandwidths. A system that allows each card or module to be able to reside in any card slot, and any combination of these personality modules in the system based upon the application is desired.

SUMMARY OF THE INVENTION

It is an advantage of the present invention to provide a system that supports different types of peripheral cards or personality modules requiring different amounts of system bandwidth.

It is another advantage to provide a system that allows peripheral cards to reside in any card slot and in any combination.

It is a further advantage to provide a system for improved utilization of system bandwidth.

In the exemplary embodiment of the present invention a Dynamic Bandwidth Allocation system supports different types of peripheral cards, or personality modules, that require different amounts of system bandwidth. Each card or module may reside in any card slot. In addition, there may be any combination of these personality modules in the system based on the application. In an exemplary embodiment, the dynamic bandwidth allocation system is designed to run the required number of parallel bits to each slot that will support the highest bandwidth personality module in the system.

The dynamic bandwidth allocation system of the present invention is contained in a digital transmission device comprising at least one slot for placing personality modules. Inside the digital transmission device is an assignable bit rate module comprised of a multiplexer, an allocation module, a controller and a microprocessor. The controller obtains information about the personality modules, such as the type and required bandwidth. This information is passed to the microprocessor which programs the allocation module. The allocation module then allocates bandwidth to the personality modules placed in the slots.

In an application where two personality modules (PIM) are required, PIM-A which requires 5 parallel bits and PIM-B which requires 10 parallel bits, any combination of PIM-As and PIM-Bs that require up to the maximum number of bits supported by the multiplexer can be used. For instance, if a multiplexer that can support 40 bits is used, 6 PIM-As and 1 PIM-B can be used (6 modules×5 bits each=30 bits and 1 module×10 bits each=40 bits for a total of 30 bits+10 bits=40 bits). 4 PIM-As and 2 PIM-Bs can also be used (4 modules×5 bits each=20 bits and 2 modules×10 bits each=20 bits for a total of 20 bits+20 bits=40 bits).

In an exemplary method of the present invention, data or payload is entered into a graphical user interface (GUI) such as a monitor or personal digital assistant (PDA). Once the payload has been received, the system checks to see if the payload exists and a request for bandwidth is made. If the payload does not exist, the system checks the availability of bandwidth, assigns bandwidth for the payload in a node if bandwidth is available and saves the bandwidth related bits into a database stored in memory. However, if no bandwidth is available, no bandwidth is assigned for the GUI request.

If on the other hand a payload exists on the system, the system checks if bandwidth has been assigned in a node. If not, the system assigns bandwidth for the payload in a node and saves the assigned bandwidth related bits into the database. However, if the bandwidth has already been assigned in a node, the system assigns a duplicate image of the bits to the PIM thus avoiding having to assign new bandwidth.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1:
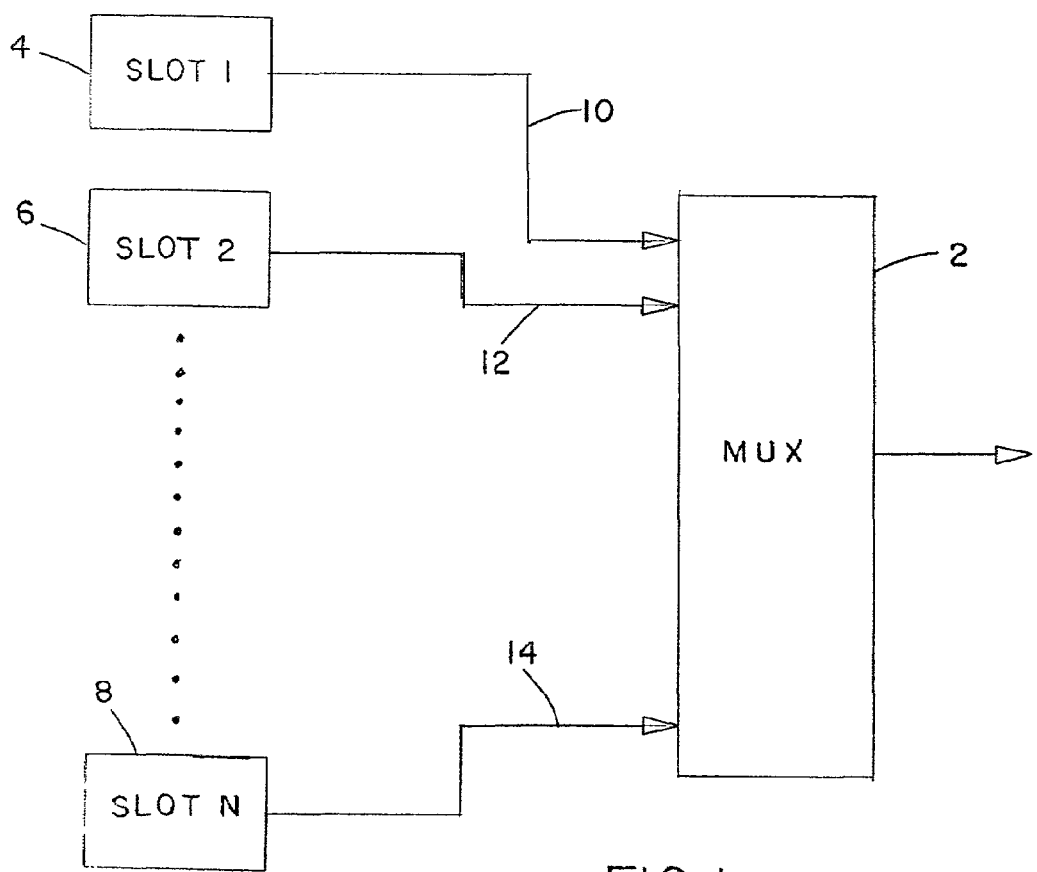
FIG. 1 is an illustration of a typical arrangement of the prior art.
Figure 2:
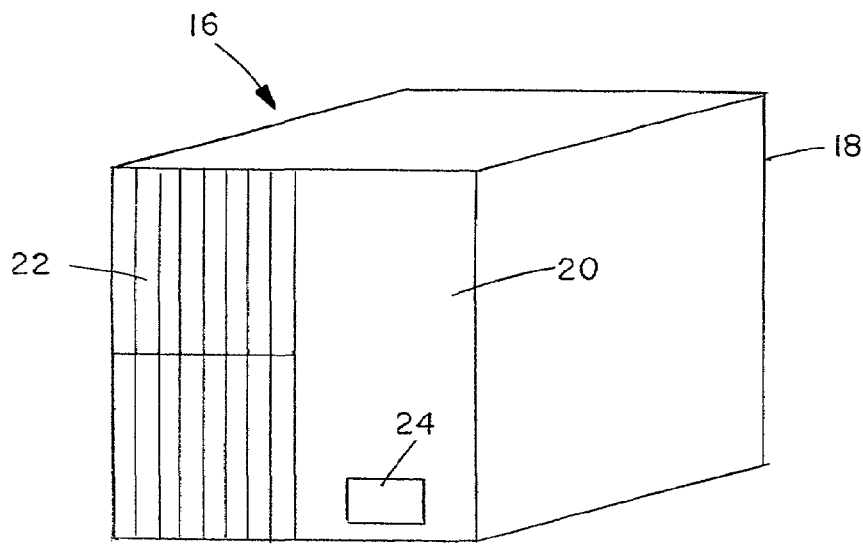
FIG. 2 is an illustration of an allocation device housing the digital transmission device of the present invention.

FIG. 2 illustrates a digital transmission device 16 that is capable of carrying multiple format data streams, or payloads, over a transmission channel, such as an optical fiber, and utilizes the dynamic bandwidth allocation system of the present invention. Data streams, such as high quality uncompressed video and audio, modulated IF carrier, data communication and network formats, commonly used throughout the world, can be utilized. The digital transmission device 16 transports these formats of payload data on a 2.488 Gb/s signal, which can be carried between the input and output terminals, or ports, of the digital transmission device 16 using a variety of fiber-optic media, including Dense Wavelength Division Multiplex (DWDM) systems. In addition, the device 16 complies with SONET and SDH standards allowing virtually unlimited transport distance using existing networks in place throughout the world.

The digital transmission device 16 is contained in an allocation device 18, such as a chassis, which is comprised of a front panel 20 having at least one slot 22. Each slot can hold a variety of different peripheral cards, or personality modules, to interface the allocation device 18 to user specific signals, such as baseband video signal, IF video signal, DS3/E3, T1/E1 and RS-232. Unlike the prior art systems, the dynamic bandwidth allocation system of the present invention allows each personality module to utilize different amounts of system bandwidth to transmit payloads giving the system the ability to simultaneously transmit a variety of data formats. The individual slots can support data bandwidth in increments of 27 Mb/s, up to a maximum of 297.44 (11×27.04)Mb/s, each of which can be utilized for either input or output. Any type of personality module, such as a transmit only module, a receive only module or a transceiver module can be placed in the slots. In the preferred embodiment, the allocation device 18 is comprised of sixteen (16) slots with eight (8) slots located in a top row of the device 18 and eight (8) slots located in a bottom row of the allocation device 18, as is illustrated in FIG. 2.

In addition to the slots, the front panel 20 contains at least one connector 24 for connecting the allocation device 18 to external devices, such as a monitor for displaying video data or speakers for listening to audio data files. Located inside the allocation device is at least one Assignable Bit Rate (ABR) module. The ABR module is a module that contains multiplexer and demultiplexer circuits and an allocation module to connect the personality modules contained in the slots to an optics transceiver module which converts high speed electrical signals from the ABR module into optical signals and vice versa. In addition, the ABR module dynamically allocates the system's bandwidth to the personality modules and provides options ranging from laser-based fiberoptic solutions to laser transmitters supporting ITU frequency-specified Dense wavelength division multiplexing (DWDM) systems. The allocation device 18 is also comprised of at least one power supply module, either universal input AC versions or various DC version power supply modules can be utilized. The ABR, optical and power supply modules can be installed singularly or in pairs for either increased system capacity or various levels of redundancy.

The ABR module also features add, drop and pass switching of transmission channels as an integral part of the allocation device 18, allowing any individual channels or groups of channels to be dropped and or passed through a terminal and new channels to be added if there is available capacity. This feature, for example, allows services to be added or cancelled (e.g., additional Ethernet capacity) at different times of the day as the demand for different types of services increase or decrease. In addition, if payloads from one Ethernet connection are being dropped at higher than some system determined rate, the ABR module can activate an additional Ethernet connection, provided there is sufficient network capacity to support the additional connection.

Figure 3:
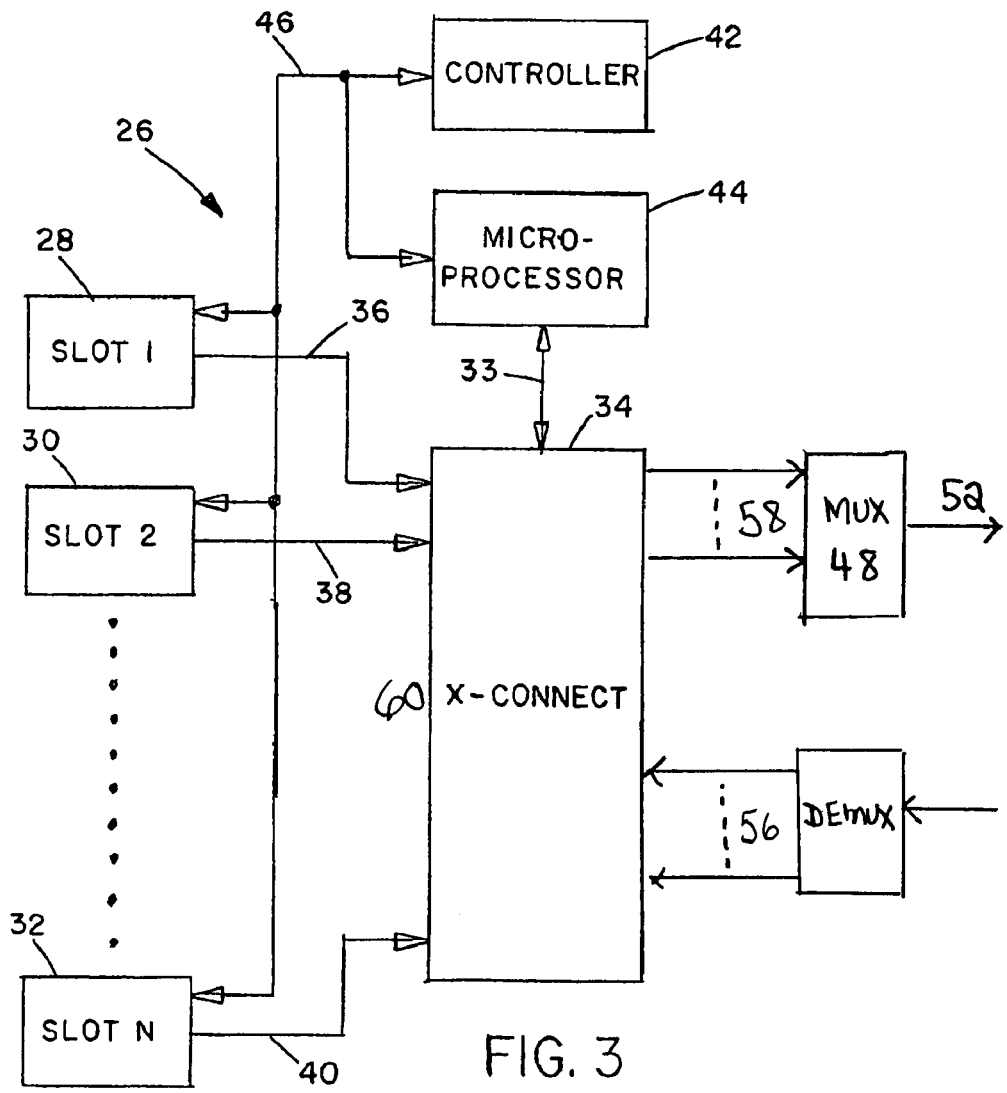
FIG. 3 is a block diagram of the arrangement of the Dynamic Bandwidth Allocation System of a preferred embodiment.

Turning now to FIG. 3, a block diagram 26 of the dynamic bandwidth allocation system of the present invention contained in the allocation device 18 of FIG. 2 is illustrated. As mentioned earlier, at least one ABR module is located inside the allocation device 18 and is comprised of an allocation module, or cross-connect module, 34 which is used to dynamically allocate the bandwidth to the personality modules, and a multiplexer 48 which performs both multiplexing and demultiplexing functions. Cross point switches, such as the I-CUBE IQX320, can be utilized for the allocation module 34. The IQX320 provides a non-blocking cross-connect function between any input port and any output port and is clocked at 27.04 MHz.

Personality modules are placed in slots 28, 30 and 32 which are connected to the allocation module 34 by first, second and third transmission channels, 36, 38 and 40 respectively. Although three slots are shown, the system can accommodate a maximum of sixteen slots for personality modules of varying bandwidth to transmit multiple format data streams over a single transmission channel. Furthermore, the allocation module 34 allocates the bit (data) rate of the first, second and third transmission channels 36, 38 and 40 and manages the bit rate structure of each channel to enable optimized multiplexing and switching of channels with different bit rates. The allocation module 34 can be programmed by software based on traffic on the channels or an operator may select the required bandwidth for a particular slot based upon the personality module placed in the slot.

If software is used to program the allocation module 34, a controller 42 is utilized to manage the operations of the personality modules contained in the slots. The controller 42 communicates with the personality modules over a fourth transmission channel 46 to obtain information from the slots, such as the type of personality module, and determines how much bandwidth to assign to each personality module for transmitting payload. Once this information has been obtained, the controller 42 communicates this information to a microprocessor 44, such as a 35 MHz 386SX with 1 MB of RAM, which is connected to the allocation module 34 by a fifth transmission channel 33. Based upon the information received from the controller 42, the microprocessor 44 programs the allocation module 34 to allocate the appropriate amount of bandwidth to each personality module. As a result, personality modules are not assigned bandwidth that is not needed to transmit payload. Instead, each personality module is assigned only the amount of bandwidth that is needed.

Furthermore, the microprocessor 44 stores the current personality module configuration and bandwidth already assigned in a database in non-volatile memory so that the last configuration indicating what type of personality module is located in each slot can be restored after the module has been removed for a service, or after the system has been powered down. Once the allocation module 34 dynamically allocates the bandwidth to the personality modules, each personality module's payload is transmitted to the allocation module 34 where it is then sent to the multiplexer 48 over a sixth transmission channel 50. The multiplexer 48 then combines the multiple signals for transmission over a single transmission channel 52.

In addition to the dynamic bandwidth allocation system of the present invention being able to accommodate personality modules having different bandwidth requirements, the system can accommodate personality modules that require the system bandwidth at different times. A system comprised of eight (8) personality modules #1-8 each requiring ten (10) parallel bits of bandwidth for a total of eighty (80) parallel bits, can utilize all of the personality modules, even if only 40 parallel bits can be supported at one time. In prior art systems, only four of the personality module (4 modules×10 bits each=40 bits) can be used, thus wasting four of the personality modules. However, if personality modules #1-4 only have payload to transmit between 8 AM and 5 PM, then the bandwidth that is normally allocated to personality modules #1-4 can be allocated to personality modules #5-8 between the hours of 5 PM and 8 AM. Thus, the system is able to utilize all of the personality modules.

Figure 4:
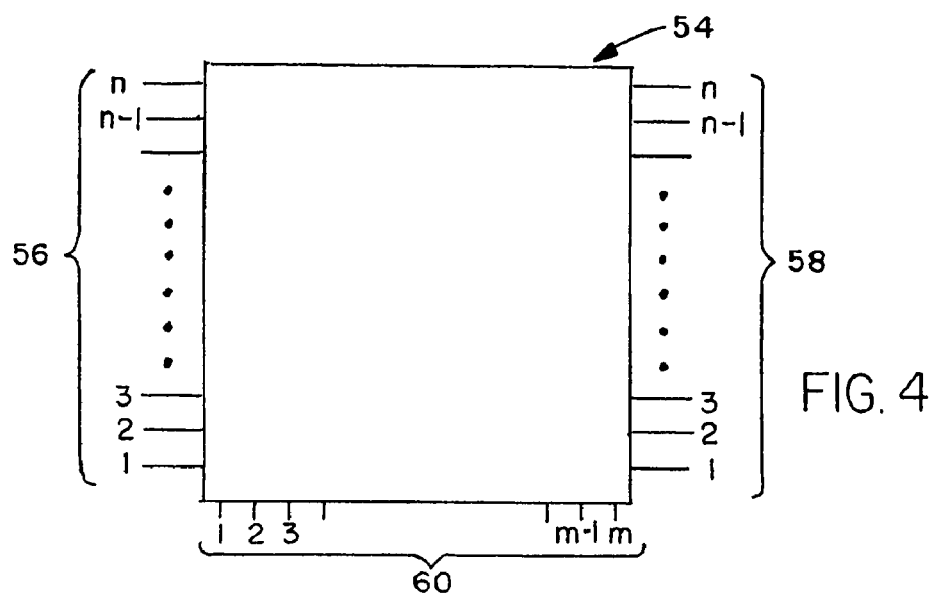
FIG. 4 is an illustration of a backplane interface circuit utilized in the preferred embodiment.

Turning now to FIG. 4, a backplane interface circuit 54 utilized in the preferred embodiment is illustrated. The backplane interface circuit 54 is an integrated circuit comprised of six (6) computer programmable logic devices (CPLDs), such as XC95108, is a part of the allocation module and is located between the personality modules and the allocation module. The CPLDs control the direction of the data flowing between the multiplexer module 48 and personality modules 28, 30 and 32 of FIG. 3. The backplane interface circuit 54 is further comprised of a set of dedicated bits 60 which are hardwired to the slots in the allocation device 18. There are a total of m dedicated bits located on the interface circuit, half, or m/2 lines are routed to the top 8 slots in the allocation device 18 and the other m/2 lines are routed to the bottom 8 slots. In the preferred embodiment, m is 134. Each slot has a total of 11 bits that are routed to it which includes some dedicated data bits and some shared bits. Three bits are shared between two neighboring slots; however, only one of these slots can use part or all of the shared bits at any given time. With this arrangement, a bandwidth of up to 297.44 Mbps (11×27.04) can be supported in one physical slot without increasing the size of the allocation module 34. No two adjacent slots can have all 11 data bits at the same time, a high bandwidth slot must alternate with a low bandwidth slot.

The data that goes between the multiplexer module 48 and the personality modules can be programmed to be either an input or an output on a per bit basis. In this context, the terms 'input' and 'output' are with respect to the multiplexer module 48. Each slot can have any number of input and output bits up to a total of 11 bits. The bits that are not used by the personality modules are programmed as outputs and tied to ground inside the allocation module 34 to prevent them from floating.

The interface circuit 54 also comprises a set of input ports 56 and a set of output ports 58. Both sets of ports, 56 and 58, are comprised of an n bit wide bus. In the preferred embodiment, the set of input ports 56 is an 88-bit wide bus that carries the data received from an incoming channel of the allocation module 34 and the set of output ports 58 is an 88-bit wide bus that carries the data to be transmitted onto the outgoing channel of the allocation module 34. Furthermore, bus 60 carries payload to and from personality modules 34. The dynamic bandwidth allocation system of the present invention dynamically allocates the bits in the set of input ports 56 and the set of output ports 58 to bus 60 which is hardwired to the personality modules 34 to transmit the payload. The multiplexer 48 then multiplexes the 88-bit wide format communications data from the allocation module 34 into a 32-bit wide data format to be transmitted across the single transmission channel 52 to external devices.

Figure 5:
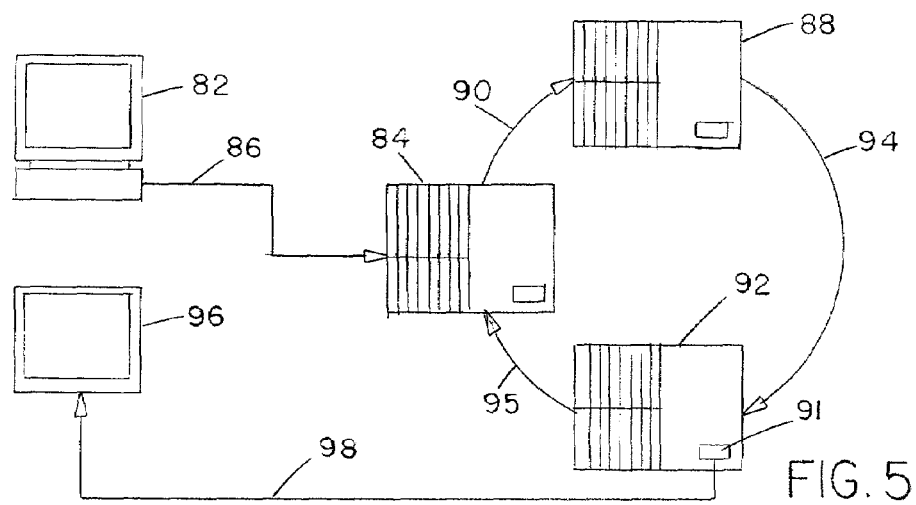
FIG. 5 is an illustration of an implementation of the dynamic bandwidth allocation system where multiple allocation devices are connected to each other in a daisy chain configuration.

A variety of network topologies or configurations, including point to point, daisy chain, multipoint broadcast, spurs and interconnected rings, is supported by the dynamic bandwidth allocation system of the present invention. FIG. 5 illustrates an implementation of the system for dynamic bandwidth allocation where multiple allocation devices are connected to each other in a daisy chain configuration. Each allocation device in the daisy chain configuration represents a node in the daisy chain and independently allocates bandwidth based upon individual availability of bandwidth. In FIG. 5, a personal computer 82 is connected to a first allocation device 84 by a first data line 86, the first allocation device 84 is connected to a second allocation device 88 by a second data line 90, the second allocation device 88 is connected to a third allocation device 92 by a third data line 94, and finally, the third allocation device 92 is connected to the first allocation device 84 by a fourth data line 95. As a result, a daisy chain configuration is created allowing any node or allocation device in the daisy chain to communicate with any other node or allocation device in the daisy chain. Data lines can be any type of cable used to transmit data.

Each of the nodes in the daisy chain contain a backplane interface circuit as described with reference to FIG. 4 to determine which input and output data lines data or payload will be transmitted on, thus dynamically allocating bandwidth. If the personal computer 82 wants to display information on a monitor 96 which is connected by a fifth data line 98 to the output connector 91 on the third allocation device 92, the nodes in the daisy chain communicate with each other to determine the best path to transmit the data or payload. First, the personal computer 82 transmits a request to the first allocation device 84 indicating a desire to display a video signal on the monitor 96. Upon receiving this request, the first allocation device 84 determines which data path to utilize to transmit the data to the monitor. In order to display the data on the monitor 96, the video signal must first be transmitted through the second and third allocation devices 88 and 92. As such, the first allocation device 84 determines which output data lines on the backplane interface circuit of the first allocation device 84 are available for transmitting the signal to the second allocation device 88. The backplane interface circuit of the first allocation device 84 assigns the video signal to the available output data lines and transmits the video signal to the second allocation device 88.

Once the second allocation device 88 receives the video signal transmission over the available data bits on the second data line 90, the backplane interface circuit in the second allocation device 88 checks the available output data lines for transmitting the video signal to the third allocation device 92. The backplane interface circuit of the second allocation device 88 then assigns the video signal to the available output data lines of the second allocation device 88 to transmit the video signal to the third allocation device 92. When the third allocation device 92 receives the video signal, the backplane interface circuit of the third allocation device 92 routes the signal to connector 91. A monitor 96 is attached to connector 91 of the third allocation device 92 by a fifth data line 98 and the video signal is transmitted to the monitor 96 where the data contained on the signal is displayed. Thus, each node in the daisy chain determines which data lines are available for transmitting payload and dynamically allocates bandwidth.

Figure 6:
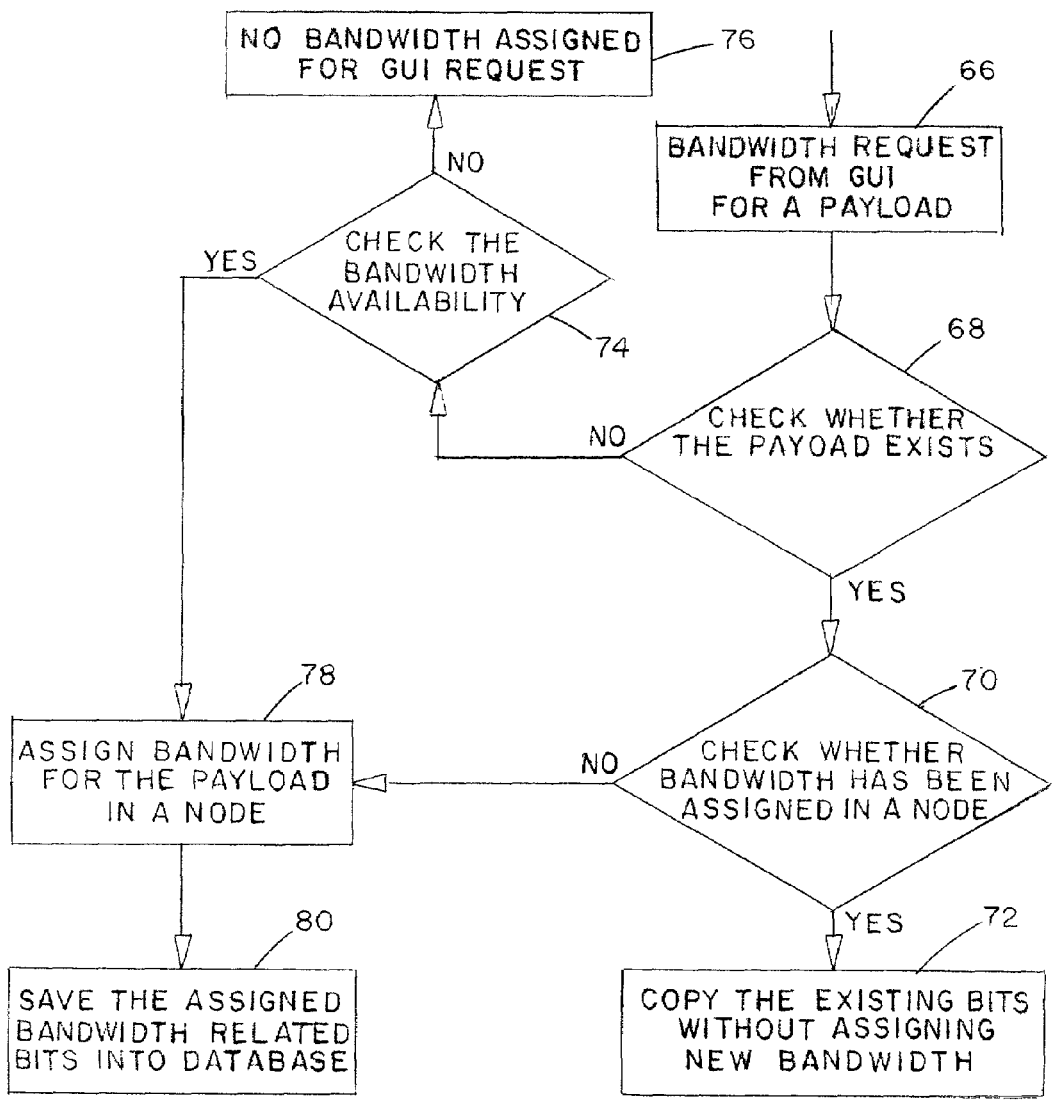
FIG. 6 is a flow chart illustrating an embodiment of a method in accordance with the present invention for dynamically allocating bandwidth in the system of FIG. 3.

FIG. 6 is a flow chart illustrating an embodiment of a method in accordance with the present invention for dynamically allocating bandwidth. Bandwidth is allocated in a node based upon the payload or data type, availability of bandwidth in the system and the source and destination of the payload in the system. The method is initiated when a payload is entered into a graphical user interface (GUI), such as a monitor, personal digital assistant (PDA) or any other device capable of displaying information connected to a node. Once the payload has been received by a personality module in a node, a bandwidth request to transmit the payload is made to the system at step 66. Before any bandwidth is assigned in a node to transmit the payload, the controller in the node checks or verifies whether a payload exists in a personality module at step 68. If the answer is yes and a payload does exist, the system checks to see whether bandwidth has already been assigned in a node to the personality module with the payload at step 70. If the node has been assigned a range of bandwidth, the system connects the node utilizing the existing bits without assigning new bandwidth at step 72.

If a payload exists, but the bandwidth has not been assigned in a node at step 70, the system assigns bandwidth for the payload in a node at step 78. Next, the system saves the assigned bandwidth related bits into a database which is stored in the memory in the microprocessor at step 80. The database is continually updated and keeps track of assigned bandwidth. However, if a payload does not already exist on the system at step 68, the system checks the available bandwidth at step 74. If no bandwidth is available, no bandwidth is assigned for the GUI request at step 76. However, if bandwidth exists, it is assigned to a personality module for the payload in a node at step 78 and the system saves the assigned bandwidth related bits into the database at step 80.

Although an exemplary embodiment of the invention has been described above by way of example only, it will be understood by those skilled in the field that modifications may be made to the disclosed embodiment without departing from the scope of the invention, which is defined by the appended claims.

We claim:

1. An allocating device for dynamically allocating bandwidth, comprising:

a plurality of personality module cards, each of said personality module cards having an independent bandwidth requirement, wherein at least two of said personality module cards have different bandwidth requirements;

an allocation module connected to said personality module cards by a plurality of transmission channels, wherein said allocation module assigns incremental bandwidths to said personality module cards based upon the bandwidth requirements of said personality module cards;

a plurality of plug-in physical slots that removably receive different personality module cards, wherein each of said plug-in physical slots is connected to said allocation module by a separate transmission channel in said plurality of transmission channels;

a microprocessor connected to said allocation module by a first transmission line that programs said allocation module to assign a bandwidth corresponding to the bandwidth requirement of said personality modules;

a multiplexer connected to said allocation module by a second transmission line; and an interface circuit between the plurality of personality module cards and the allocation module, the interface circuit controlling the direction of data flow between the multiplexer and the plurality of personality module cards, wherein the interface circuit comprises a plurality of bits hardwired to the plug-in physical slots, and wherein each plug-in physical slot has both dedicated data bits and data bits that are shared between neighboring plug-in physical slots;

wherein allocation of bandwidth to said personality module cards is dynamic with respect to both changes in types of personality module cards in said plurality of plug-in physical slots and changes in bandwidth requirements of each personality module cards at different times, and each personality module card has capability to reside in any plug-in physical slot and in any combination.

2. The device of claim 1, further comprising a controller connected to said microprocessor and said personality module cards by a data line, wherein said controller obtains information from each personality module cards to determine how much bandwidth to assign to said personality module card for transmitting data from said personality module card.

3. The device of claim 2, wherein each of said personality module cards is assigned incremental bandwidths with 27 Mb/s granularity.

4. The device of claim 1, wherein said multiplexer obtains a payload from said each of said plurality of personality module cards and combines said payload for transmission over a single transmission channel.

5. The device of claim 4, wherein said allocation module further comprises an interface circuit, wherein said interface circuit comprises a set of input lines, a set of output lines, and a set of dedicated bits, and wherein said interface circuit controls the direction of said payload that flows between said multiplexer and said plurality of personality module cards, and determines which of said output lines to transmit said payload on.

6. The device of claim 5, wherein said set of input lines comprises an 88-bit wide bus.

7. The device of claim 6, wherein said set of output lines comprises an 88-bit wide bus.

8. The device of claim 7, wherein said set of dedicated bits carries said payload to and from said plurality of personality module cards.

9. The device of claim 8, wherein said payload is high quality uncompressed video.

10. The device of claim 8, wherein said payload is high quality uncompressed audio.

11. The device of claim 8, wherein said payload is a modulated IF carrier.

12. The device of claim 8, wherein said plurality of personality module cards is selected from a group consisting of a transmit-only module, a receive-only module, and a transceiver module.

13. The device of claim 12, wherein a front panel of said allocating device comprises a connector for connecting an external device to said allocation module.

14. The device of claim 13, wherein said external device is a monitor for displaying video data.

* * * * *